United States Patent

[11] 3,597,642

[72] Inventor Kikuo Kurino
Suwa-shi, Japan

[21] Appl. No. 883,730
[22] Filed Dec. 10, 1969
[45] Patented Aug. 3, 1971
[73] Assignee Kabushiki Kaisha Suwa Seikosha
Tokyo, Japan
[32] Priority Dec. 13, 1968
[33] Japan
[31] 43/91113

[54] ELECTROSTRICTIVELY DRIVEN TUNING FORK
2 Claims, 2 Drawing Figs.

[52] U.S. Cl. 310/8.2, 58/23, 84/409, 310/8.5
[51] Int. Cl. H01v 7/00
[50] Field of Search 310/8.1, 8.2, 8.3, 8.7, 25; 84/409, 457; 58/23 TF

[56] References Cited

UNITED STATES PATENTS

| | | | |
|---|---|---|---|
| 1,849,271 | 3/1932 | Bower | 58/23 X |
| 2,247,960 | 7/1941 | Michaels | 310/25 X |
| 3,142,027 | 7/1964 | Albsmeier et al. | 333/72 |
| 2,918,589 | 12/1959 | Quenouille | 310/25 X |
| 1,637,442 | 8/1927 | Dorsey | 310/25 X |
| 2,581,963 | 1/1952 | Langloys | 84/409 X |
| 3,461,326 | 8/1969 | Holt | 84/409 X |

*Primary Examiner*—Milton O. Hirshfield
*Assistant Examiner*—B. A. Reynolds
*Attorney*—Blum, Moscovitz, Friedman and Kaplan

ABSTRACT: An electrostrictively driven tuning fork having tines of nonuniform thickness and at least one electrostrictive element fixed to the thicker root portion of said tines.

ELECTROSTRICTIVELY DRIVEN TUNING FORK

DETAILED DESCRIPTION OF THE INVENTION

The present invention relates to an improved tuning fork shape for an electronic timepiece which is driven and detected by an electrostrictive element such as $PbZrTiO_3$ to electrostrictively maintain the vibration of the said tuning fork.

An object of the invention is to provide an electrostrictively driven tuning fork wherein characteristics and performance of the vibrator are not impaired even by the fixation of the electrostrictive element to the tuning fork.

Another object of the invention is to provide an electrostrictively driven tuning fork wherein temperature characteristics are not deteriorated even by the fixation of the electrostrictive element to the tuning fork.

A further object of the invention is to provide an electrostrictively driven tuning fork wherein Q value of the vibrator is not deteriorated even by the fixation of the electrostrictive element to the tuning fork.

Figure 1:
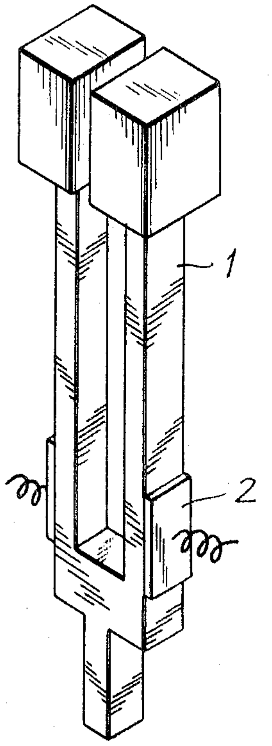
FIG. 1 shows a conventional type of electrostrictively driven tuning fork.

The electrostrictively driven tuning fork as shown in FIG. 1 has been commonly used. Electrostrictive elements 2 are fixed to the root portions of the tuning fork 1, where the electro mechanical coefficient of the vibrator is the highest. At the same time, the root portions of the times are easily influenced by characteristics and performance of the electrostrictive elements attached. The temperature characteristics of the tuning fork of Ni-Span-C deteriorates when the electrostrictive elements having inferior temperature characteristics are fixed to its root portions. In addition Q value lowers and frequency varies due to the change in temperature. For these reasons it is difficult to realize high precision watch comprising a electrostrictive tuning fork as the time standard.

The present invention seeks to eliminate the above defects and to provide a high accuracy watch driven by the electrostrictive tuning fork.

Figure 2:
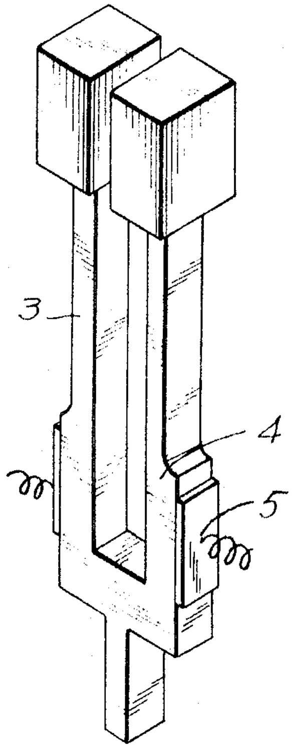
FIG. 2 shows one embodiment of electrostrictively driven tuning fork according to the invention.

FIG. 2 shows an embodiment of the electrostrictive tuning fork according to the invention.

In the electrostrictive tuning fork according to the invention the root portions 4 of the tines are made thicker in width and/or depth than the other operative portions of the tines and the electrostrictive elements are fixedly attached to these thicker root portions 4.

In the tuning fork of this type, it is the thin portions 3 that effect the equivalent compliance of the vibrator. Explaining in more detail, the equivalent compliance which determines resonant frequency is inversely proportional to the third power of thickness of the tines. Compared with the portions 3, the portions 4 are rigid in flexibility, therefore frequency of the vibrator is mainly determined by the equivalent compliance of the portions 3. Consequently, contrary to the conventional type of tuning fork, resonant frequency of the improved tuning fork does not shift by the fixation of the electrostrictive elements to the sides of the tines. If the tuning fork is made of such metal as elimber or Ni-Span-C, its frequency temperature characteristics are stabilized.

Portions 3 of the tuning fork mainly vibrate and portions 4 to which the electrostrictive elements are fixed scarcely vibrate. The vibrating energy of the electrostrictive element is very small compared with that of the tuning fork. As a result, Q value of the tuning fork does not deteriorate.

The advantages as described above permits production of incorporating a watch low power electrostrictive tuning fork. The tuning fork according to the invention is influenced neither by aging of the electrostrictive elements nor change in temperature.

In the above embodiment the vibrator is driven electrostrictively but a piezoelectrically driven vibrator also comes within the scope of the invention.

What I claim is:

1. An electrostrictively driven tuning fork comprising tines having a root region having a cross-sectional area of a first dimension and an operative region extending from said root region of a cross-sectional area of a second dimension smaller than said first dimension; and at least one electrostrictive element fixed to said root portion.

2. An electrostrictively driven tuning fork as recited in claim 1, wherein said electrostrictive element is formed from $PbZrTiO_3$.